E. OLSON.
HARROW.
APPLICATION FILED MAR. 18, 1914.

1,136,043.

Patented Apr. 20, 1915.
2 SHEETS—SHEET 1.

WITNESSES
Emil Hallenberg
Paul A. Viesen

INVENTOR.
E. Olson
By H. Sanders
Atty.

E. OLSON.
HARROW.
APPLICATION FILED MAR. 18, 1914.

1,136,043.

Patented Apr. 20, 1915.
2 SHEETS—SHEET 2.

WITNESSES
Emil Hallenberg.
Paul A. Viersen

INVENTOR.
E. Olson
By H. Sanders
Atty.

UNITED STATES PATENT OFFICE.

EDWARD OLSON, OF PENCER, MINNESOTA.

HARROW.

1,136,043.

Specification of Letters Patent.

Patented Apr. 20, 1915.

Application filed March 18, 1914. Serial No. 825,524.

*To all whom it may concern:*

Be it known that I, EDWARD OLSON, a citizen of the United States, residing at Pencer, in the county of Roseau and State of Minnesota, have invented certain new and useful Improvements in Harrows, of which the following is a specification.

This invention relates to improvements in harrows and more particularly to a harrow provided with means for raising the frame and teeth off the ground so the latter may be cleaned, adjusted or repaired.

With the foregoing and other objects in view the invention consists in the combination and arrangement of parts to be hereinafter fully described in the following specification, pointed out in the claim and illustrated in the accompanying drawings which form a part of said specification and in which—

Figure 1:
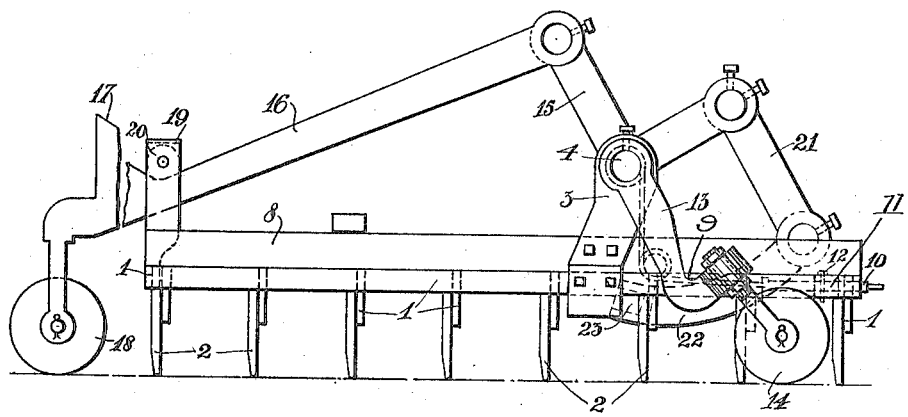
Figure 2:
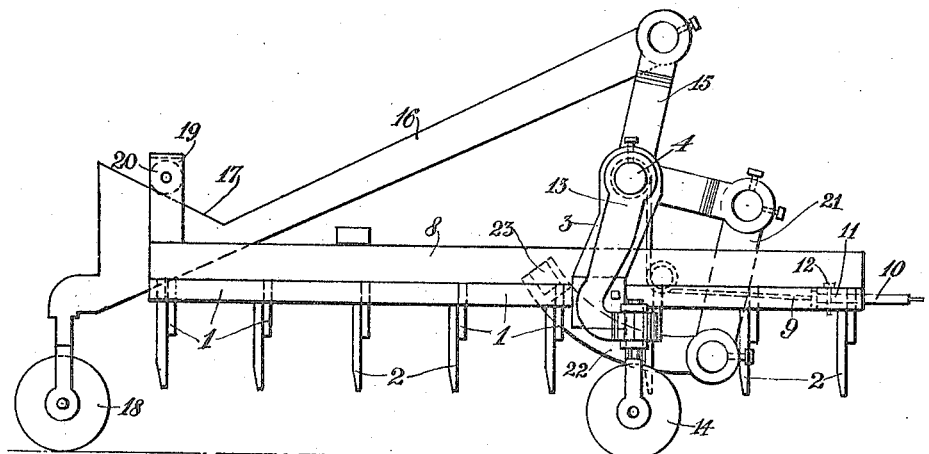
Figure 3:
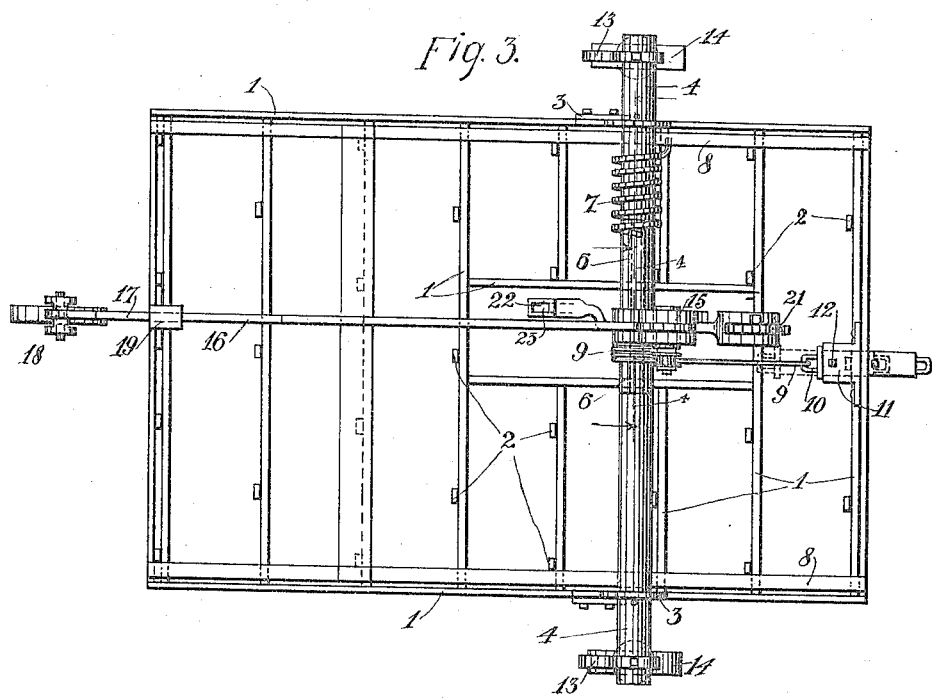
Figure 4:
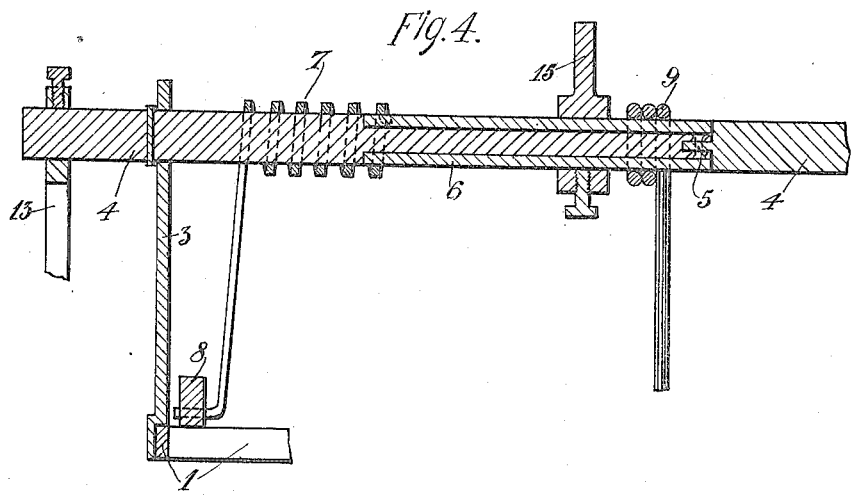

Figure 1 is a side elevation of my improved harrow. Fig. 2 is a similar view with the frame and teeth raised. Fig. 3 is a plan. Fig. 4 is a section taken on line 4—4 of Fig. 3.

Like reference characters indicate corresponding parts throughout the several views.

My harrow comprises a frame 1 provided with teeth 2 and with standards 3, 3 which carry a transverse shaft 4 which is a 2-piece shaft whose sections are bolted together at 5.

A rotary sleeve 6 is disposed upon the shaft 4 and to the same one end of a spiral spring 7 is secured which spring is wound about the shaft 4 and has its opposite termination secured to one of the lateral members 8 of the frame.

A cable 9 is wound upon the sleeve 6 and connected at one end to the draw bar 10, slidably disposed in the casting 11 secured to the frame, to which the horses or other draft animals are secured to propel the machine.

12 is a stay pin releasably locking the draw bar in fixed relation with the casting 11.

Upon the shaft 4 angular castings 13, 13 are secured which carry the side wheels 14 upon which the frame runs when the machine is not in use as a harrow and a bell-crank lever 15 also secured to the shaft 4 carries one end of a shaft 16, which is formed with an inclined shoulder 17, and that carries a wheel 18 which serves to carry the rear end of the frame 1.

A bearing 19 is secured to the rear of the frame in which a wheel 20 runs that serves as a bearing for the shoulder 17 of shaft 16 as the same is moved lengthwise of the frame in a manner to be hereinafter described.

21 is a link connecting the bell crank lever 15 with a curved link 22 which is formed with a terminal socket 23 which is adapted to receive one end of a lift bar or rod (not shown) by means of which the movable parts of the device may be actuated to raise the frame and teeth of the device from the ground. The shaft 4 can be rotated in its bearings and the bell crank lever 15 is fast to said shaft as also are the castings 13.

In Fig. 1 the harrow frame and teeth are shown in operative position which position can be disturbed by either of two operations. The lift bar may be terminally inserted in the socket 23 of the curved link 22 and this link manually raised thereby to the position shown in Fig. 2 which operation will cause link 21 to partially rotate the bell crank lever and also the rod 4 thus drawing the lever 16 and wheel 18 toward rod 4 and lifting the rear end of the frame into the air; at the same time the casting 13 will be moved into such position as to throw the wheels 14 approximately in the vertical plane of the rod 4 thus raising the front end of the frame also. Should it be desired to use the draft animals to raise the frame the stay pin 12 is removed from the casting 11 and the animal caused to pull upon the draw bar which will cause the cable 9 to rotate the sleeve 6 and the spring 7 to rotate the shaft 4 again raising the frame in the manner previously described. By means of the stay pin the draw bar and casting 11 may be locked in adjusted position and the harrow locked in this position. When the stay pin is withdrawn the spring 7 will operate to withdraw the draw bar to normal position by means of cable 9 and to loosen its grip upon shaft 4 permitting the same to rotate and again place the wheels in normal position letting down the frame 1 and its teeth.

What is claimed is:—

In a harrow comprising a frame provided with teeth, a rotary shaft extending transversely of said frame and disposed thereabove, a sleeve disposed upon said shaft, a spring connecting said sleeve and harrow frame and wound about said rotary shaft, a cable connecting said sleeve and the draw bar of the harrow frame, castings made fast to said rotary shaft and provided with wheels, a bell crank made fast to said rotary shaft, a wheeled shaft connected to said bell crank to support one end of the harrow frame and a stay pin for said draw bar whereby the same may be locked in adjusted position with relation to the harrow frame.

In testimony that I claim the foregoing as my own I have hereto affixed my signature in the presence of two subscribing witnesses.

EDWARD OLSON.

Witnesses:
 JIM ERICKSON,
 LOUIS ENSTROM.

Copies of this patent may be obtained for five cents each, by addressing the "Commissioner of Patents, Washington, D. C."